United States Patent
Toyohara et al.

(12)

(10) Patent No.: US 6,226,108 B1
(45) Date of Patent: *May 1, 2001

(54) IMAGE PROCESSING APPARATUS AND METHOD FOR REPRODUCING HIGH QUALITY IMAGE IN LOW-DENSITY PORTION

(75) Inventors: Yuichiro Toyohara, Tokyo; Tsuyoshi Kunishi, Ibaraki-ken; Yukio Watanabe, Machida, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,935

(22) Filed: Nov. 8, 1996

(30) Foreign Application Priority Data

Nov. 10, 1995 (JP) .................................................. 7-293125

(51) Int. Cl.[7] ................................ G03F 3/08; H04N 1/46
(52) U.S. Cl. .......................... 358/519; 358/504; 358/523
(58) Field of Search ..................................... 358/519, 518, 358/504, 523, 522; 395/109, 112, 117; 382/167, 274; 347/115; 399/46, 49, 39, 9

(56) References Cited

U.S. PATENT DOCUMENTS

| | | | |
|---|---|---|---|
| 4,888,636 | 12/1989 | Abe | 358/519 |
| 5,258,783 | * 11/1993 | Sasanuma et al. | 358/519 |
| 5,305,057 | * 4/1994 | Hattori et al. | 358/519 |
| 5,566,372 | 10/1996 | Ikeda et al. | 399/46 |
| 5,574,544 | * 11/1996 | Yoshino et al. | 358/519 |
| 5,579,090 | 11/1996 | Sasanuma et al. | 399/49 |
| 5,586,927 | * 12/1996 | Fukui et al. | 358/519 |
| 5,594,557 | * 1/1997 | Rolleston | 358/504 |
| 5,664,072 | * 9/1997 | Ueda | 358/504 |
| 5,696,889 | * 12/1997 | Morikawa | 358/521 |
| 5,710,871 | * 1/1998 | Tadenuma et al. | 395/109 |
| 5,721,623 | * 2/1998 | Boxma | 358/504 |
| 5,760,913 | * 6/1998 | Falk | 358/504 |
| 5,764,796 | * 6/1998 | Smith | 358/504 |
| 5,809,366 | * 9/1998 | Yamakawa et al. | 358/519 |

* cited by examiner

Primary Examiner—Cheukfan Lee
(74) Attorney, Agent, or Firm—Fitzpatrick, Cella, Harper & Scinto

(57) ABSTRACT

When an image is adjusted to compensate for individual differences among image forming units, there are cases where a phenomenon occurs in which a contour that is originally non-existent appears in a low-density portion, namely an area other than that where the output density characteristic is linear. In such instances image quality deteriorates markedly when importance is placed upon tonality. To solve this problem, a printer is caused to print an image diagnostic pattern, the image diagnostic pattern that has been printed is read by a reader and the linear portion of the output density characteristic of a design center value and the linear portion of the read output density characteristic are approximated by straight lines. Both of the output density characteristics are compared and image adjustment coefficients A, B are compared. The coefficients A, B thus obtained are set in a primary converter and gamma tables in a gamma converter are changed over in conformity with the values of the coefficients A, B.

19 Claims, 12 Drawing Sheets

IMAGE PROCESSING APPARATUS AND METHOD FOR REPRODUCING HIGH QUALITY IMAGE IN LOW-DENSITY PORTION

BACKGROUND OF THE INVENTION

1. Field of the Invention

This invention relates to an image processing apparatus and method. More particularly, the invention relates to an image processing apparatus and method for processing input image data in such a manner that a predetermined output characteristic is obtained.

2. Description of the Related Art

The gamma table in an image forming apparatus is engineered in such a manner that the design center value of an output density characteristic under conditions in which a conversion is not being applied will be converted to a desired output density characteristic. However, owing to error attributable to the variety of component parts that constitute an image forming apparatus, the finished products exhibit output density characteristics that differ from one apparatus to the another.

FIG. 1 is a diagram showing an example of the output density characteristic of such an apparatus. Here an image signal value is plotted along the horizontal axis and output density along the vertical axis. The curve indicated at 2-a represents the design center value of the output density characteristic, and the curve indicated at 2-b represents an output density characteristic that has deviated from the design central value.

Recent technological advances have led to the appearance of many image forming apparatus equipped with photographic and other modes for reproducing high-definition images exhibiting a high degree of tonality. Individual differences in output density characteristics in such apparatus greatly detract from image quality. Accordingly, methods of printing an image based upon a prescribed image signal, measuring the output density characteristic of the apparatus by reading the image and then correcting the output density that has been measured have been disclosed in U.S. Pat. No. 5,258,783 and U.S. Pat. No. 4,888,636.

Though a variety of these correction methods have been developed, it is generally necessary to implement them upon balancing cost against required image quality in the case of a monochromatic image forming apparatus. More specifically, since the output density characteristic in the vicinity of intermediate density is linear, as shown in FIG. 1, a primary conversion which makes this linear portion conform to the design center value is applied to the image signal of an apparatus whose output density characteristic has deviated. This shall be referred to as a "linear image adjustment" below. This adjustment makes it possible to obtain the desired output density characteristic irrespective of individual differences in the image forming apparatus.

However, a problem which arises is that when a linear image adjustment is carried out, there are instances where the output density characteristic exhibits a characteristic different from the design center value in a density area other than that where the output density characteristic is linear. In such instances there is no problem in terms of density reproducibility of image halftones but there are cases where a phenomenon occurs in which a contour that is originally non-existent appears in portions where density is low. This shall be referred to as a "false contour phenomenon" below. In particular, when importance is placed upon gradation, as in the case of the photograph mode, image quality deteriorates markedly if the false contour phenomenon occurs.

SUMMARY OF THE INVENTION

An object of the present invention is to solve the aforementioned problems and provide an image processing apparatus and method in which individual differences in apparatus output characteristics are compensated for and in which it is possible to prevent a deterioration in image quality due to the false contour phenomenon.

According to the present invention, the foregoing object is attained by providing an image processing apparatus comprising converting means for converting input image data in such a manner that a predetermined output characteristic is obtained, and correcting means for correcting the image data, which have been converted by the converting means, in such a manner that a standard output characteristic is obtained, wherein the converting means alters a conversion characteristic in dependence upon a correction characteristic of the correcting means.

Further, according to the present invention, the foregoing object is attained by providing an image processing method using a reading device for reading an original and generating image data indicative of the original read, and an output device for forming an image on a medium in dependence upon the image data, the method comprising the steps of forming a reference image by the output device, deciding a correction characteristic, which is for correcting an output characteristic of the output device, using image data obtained by reading the reference image by the reading device. The output device has a plurality of output modes corresponding to a plurality of output characteristics that differ from one another and decides the correction characteristic in conformity with the output mode.

Another object of the invention is to speed up the correction of an image forming apparatus based upon an output image.

A further object of the invention is to correct an image forming apparatus based upon an output image while holding down cost.

Yet another object of the invention is to provide a novel method of correcting density.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An image processing apparatus according to embodiments of the invention will now be described in detail with reference to the drawings.

First Embodiment

[Configuration]

Figure 1:
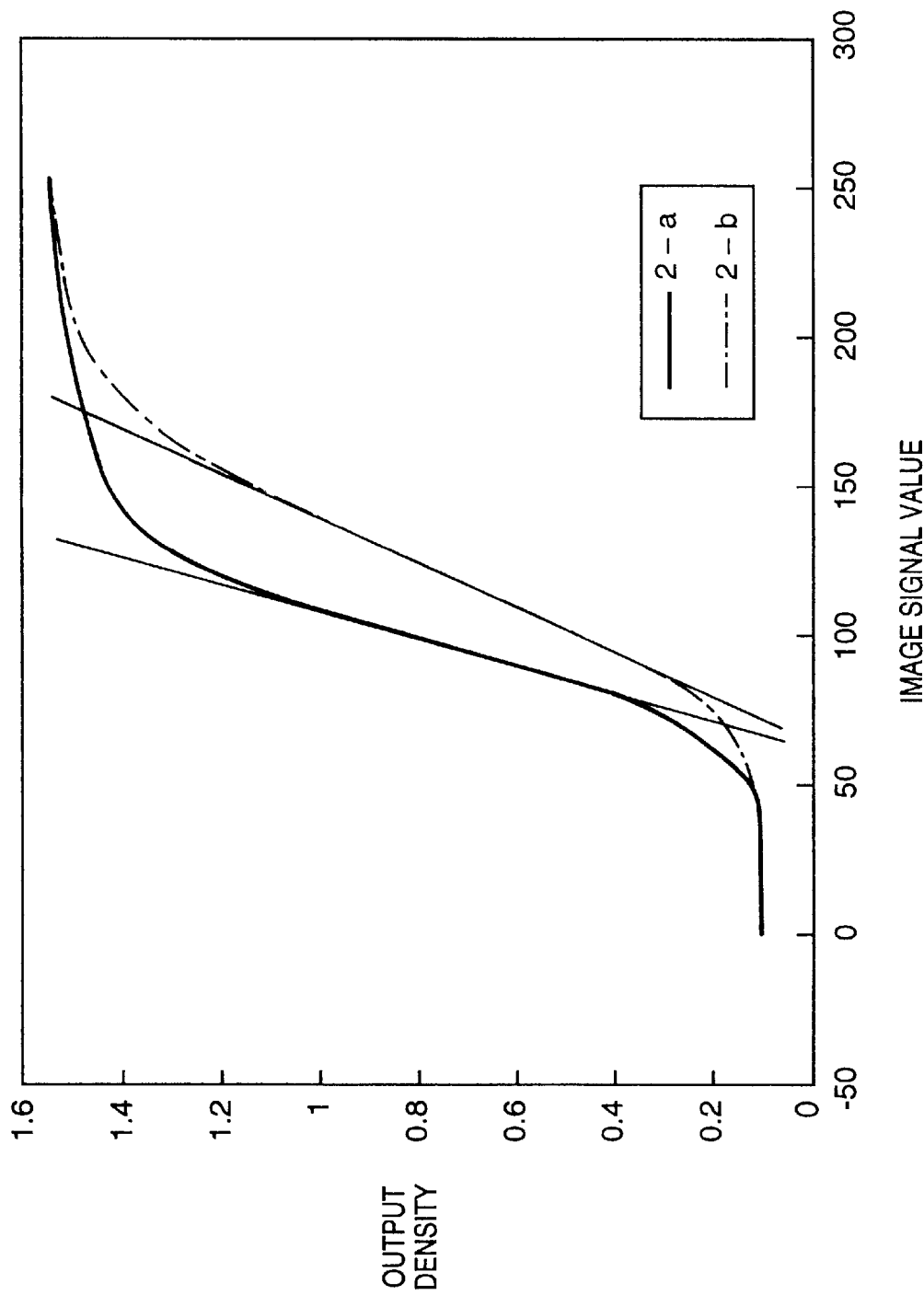
FIG. 1 is a characteristic diagram illustrating the output density characteristic of an image forming apparatus.
Figure 2:
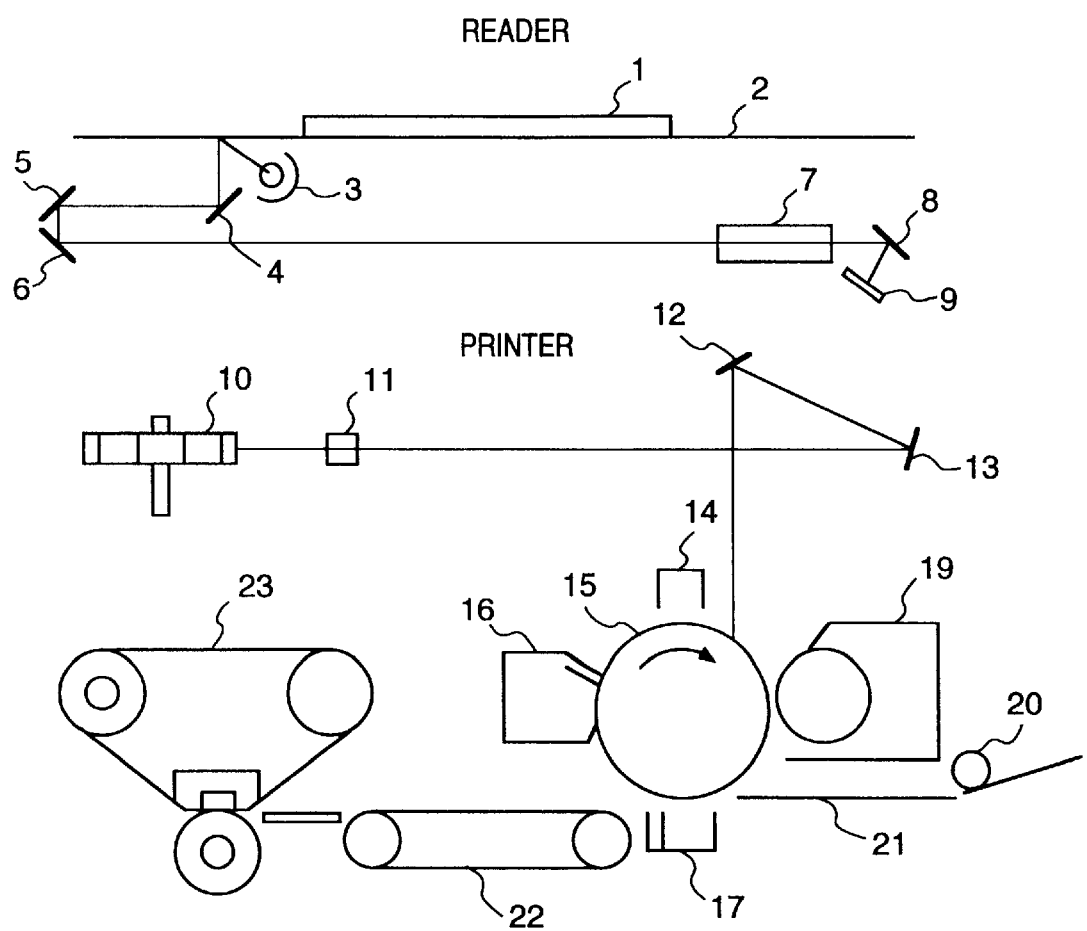
FIG. 2 is a schematic view illustrating an example of the construction of a digital copier to which the present invention is applied.
Figure 3:
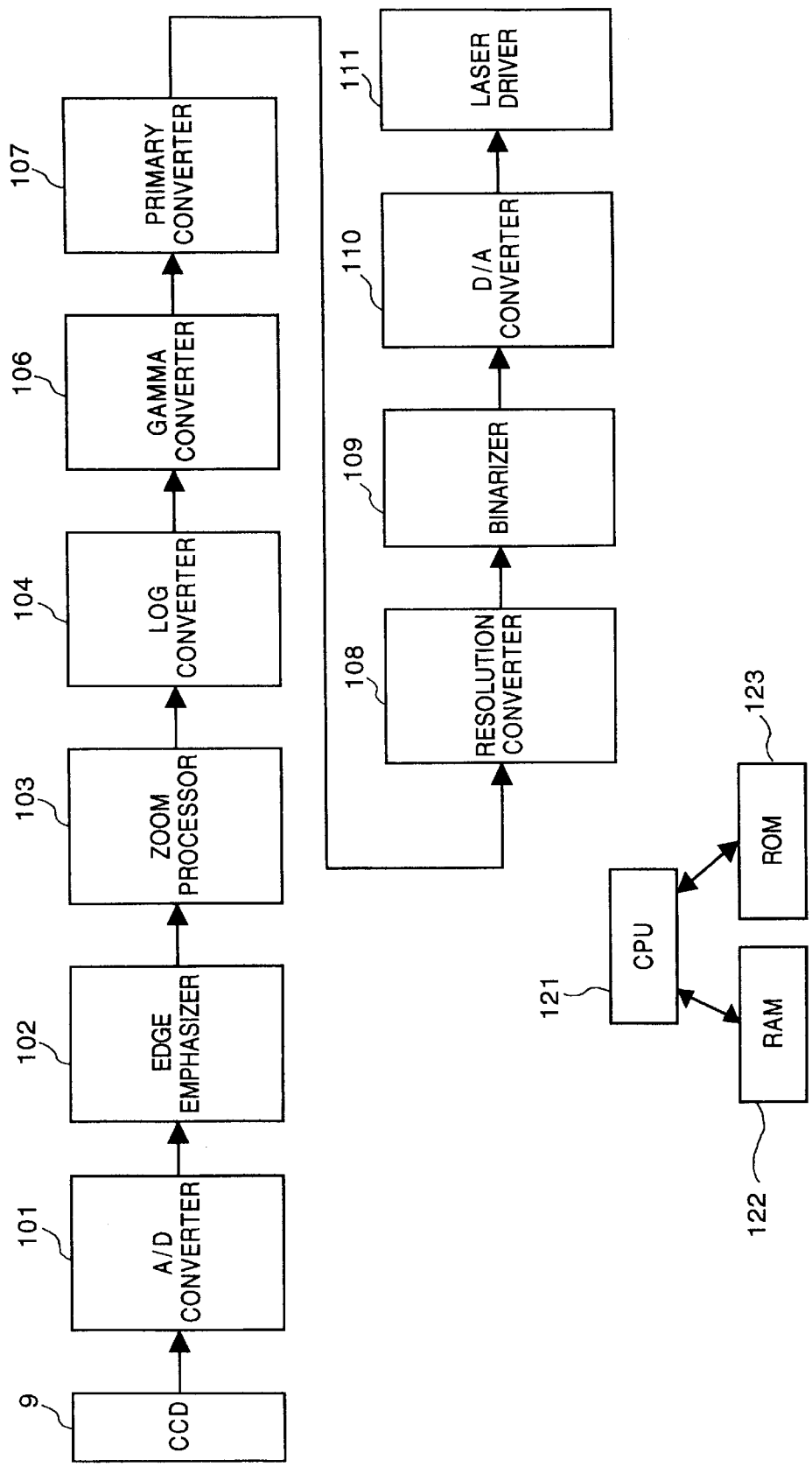
FIG. 3 is a block diagram illustrating an example of image processing blocks of the digital copier shown in FIG. 2.

FIG. 2 is a schematic view illustrating the construction of a digital copier to which the present invention is applied, and FIG. 3 is a block diagram illustrating image processing blocks of the digital copier shown in FIG. 2.

As shown in FIG. 2, an original placed upon a glass platen 2 is illuminated by light emitted by a lamp 3. Light reflected from the original 1 is condensed on a CCD line sensor 9 via mirrors 4~6, a lens 7 and a mirror 8. An analog signal outputted by the CCD line sensor 9 is quantized and converted to an eight-bit (256-level) digital signal by an AD converter 101 shown in FIG. 3. After being subjected to image processing by an edge emphasizer 102 and zoom processor 103, the digital image signal undergoes a luminance-to-density data conversion in a LOG converter 104. The digital signal that has undergone the conversion to density data is density-converted (gamma-converted) by a γ-converter 106 to an image signal that matches the image reproducing characteristic of a printer. A resolution converter 108 effects a conversion to a resolution conforming to the recording density of the printer. A primary converter 107 will be described later.

In a case where the printer outputs two values per pixel or when it is desired to output a bi-level image, the digital signal that was subjected to the resolution conversion is binarized by a binarizer 109. In a case where it is desired to output a multivalued image by a printer capable of outputting multiple values per pixel, the digital signal is not binarized but is converted to an analog signal by a D/A converter 110, and the analog signal is sent to a laser driver 111. The latter drives a laser element (not shown), whereby a laser beam is emitted.

The laser beam outputted by the laser element is scanned by a polygon mirror 10. An electrostatic latent image is formed on a photosensitive drum 15, the surface of which has been uniformly charged by a primary corona discharge device 14, via an f-θ lens 11 and mirrors 13, 12. The latent image that has been formed on the photosensitive drum 15 is developed by a developing device 19 using toner. The toner image formed is transferred to recording paper 21 supplied by a paper supply roll 20. The recording paper 21 to which the toner image has been transferred is conveyed by a conveyor belt 22 and the toner image is fixed on the recording paper 21 semipermanently by a fixing device 23. The recording paper is then discharged from the apparatus.

Meanwhile, the photosensitive drum 15 from which the toner image has been transferred has remaining toner removed by a cleaner 16, after which the drum is charged by the primary corona discharge device 14 to prepare for formation of the next latent image.

The gamma table in the gamma converter 106 has been engineered in such a manner that the output density characteristic of the apparatus will be the design center value. However, there are many cases where the output density characteristic of the design center value is not obtained owing to individual differences among the component parts of the apparatus. In order to compensate for these individual differences, the apparatus is provided with the primary converter 107, which serves as image adjusting means for subjecting the gamma-corrected image signal to processing that corrects the deviation in the output density characteristic.

A CPU 121 shown in FIG. 3 controls the aforementioned blocks in accordance with a control program stored in a ROM 123. In accordance with the program stored in the ROM 123, the CPU 121 executes various image processing as well as image adjustment processing, described later, using a RAM 122 as a working memory.

[Image adjusting produce]

Image adjustment processing for measuring the output density characteristic of the apparatus and then correcting the measured output density characteristic will now be described.

Figure 4:
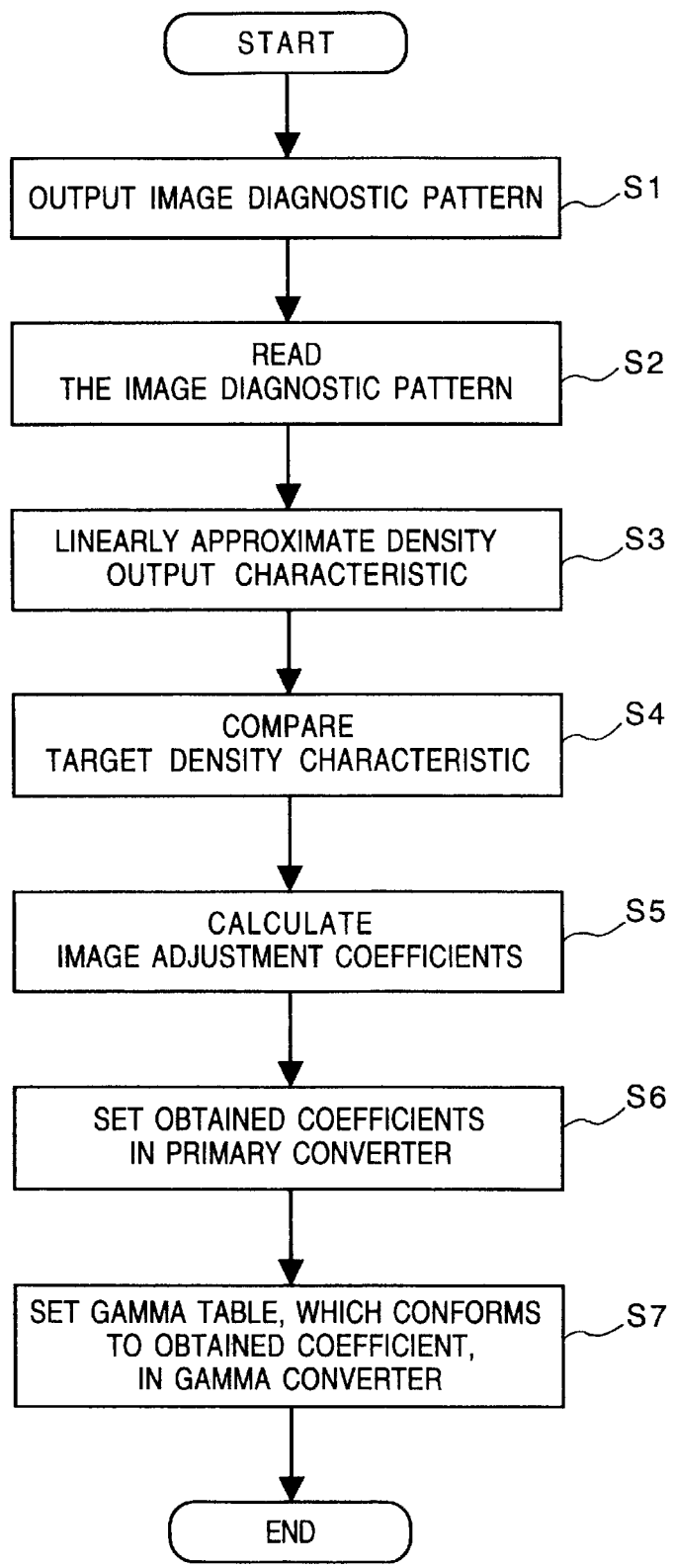
FIG. 4 is a flowchart showing an example of image adjustment processing.

FIG. 4 is a flowchart illustrating image adjustment processing. Step S1 of FIG. 4 calls for the printer to print an image diagnostic pattern based upon an image signal representing a reference density pattern. The image diagnostic pattern that has been printed is read at step S2. This image diagnostic pattern is a pattern composed of a patch having a plurality of gray levels.

Figure 5:
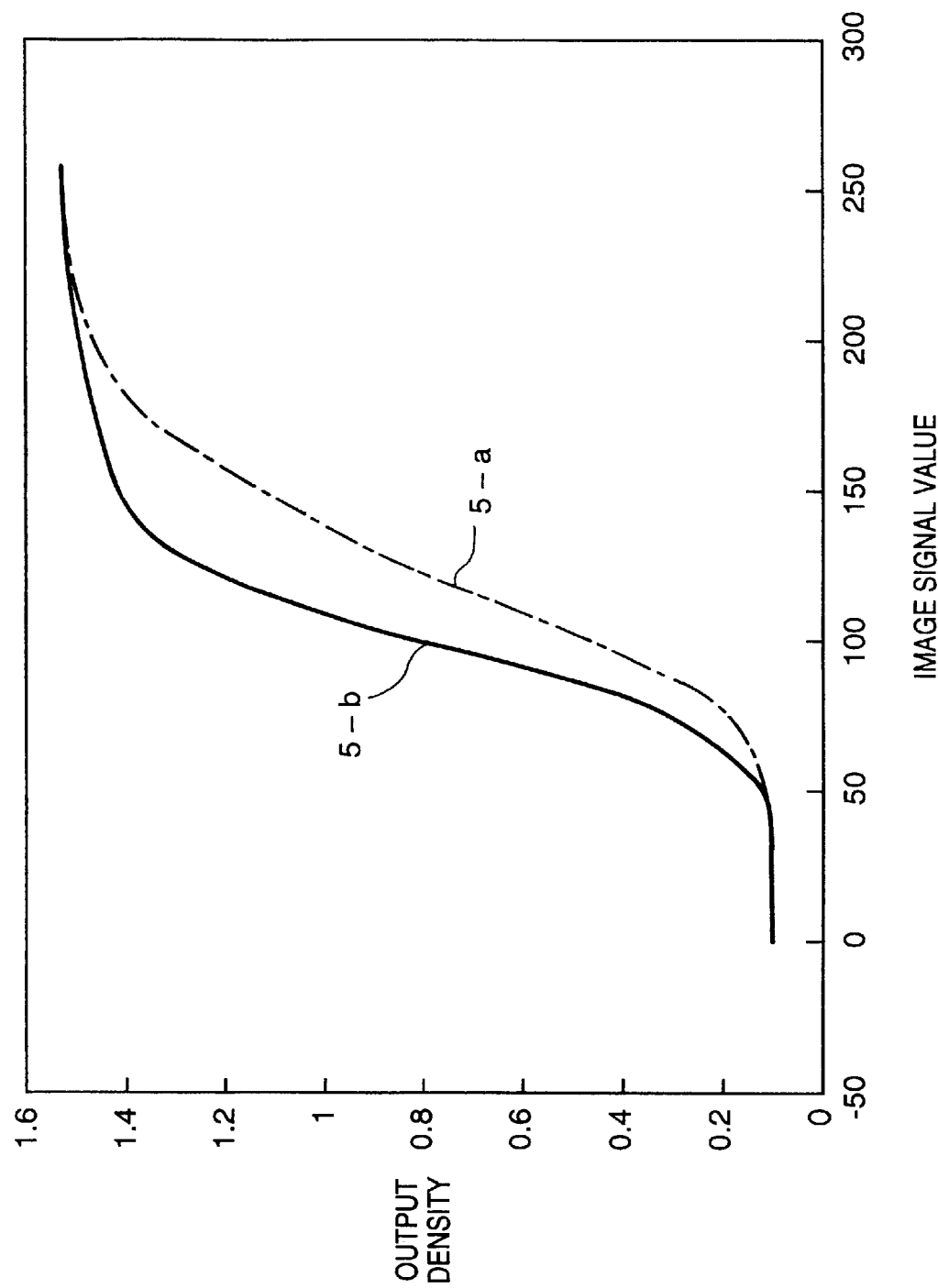
FIG. 5 is a characteristic diagram illustrating an example of an output density characteristic.

FIG. 5 is a diagram showing an example of an output density characteristic. The curve indicated at 5-a represents the design center value of the output density characteristic, and the curve indicated at 5-b represents an output density characteristic that has deviated from the design central value, namely the output density characteristic that has been measured. Since the output density characteristic in the vicinity of intermediate density is linear, as shown in FIG. 5, it will suffice for a primary conversion which makes this linear portion conform to the design center value to be applied to the image signal of an apparatus whose output density characteristic has deviated.

More specifically, the linear portion of the output density characteristic of the design center value is linearly approximated to the following equation at step S3:

$$N = A1(X - B1) \tag{1}$$

where X represents the image signal value, N the output density, A1 the slope of the straight line and B1 an offset.

On the other hand, the linear portion of the output density characteristic of the apparatus whose output density characteristic has deviated is linearly approximated to the following equation at step S3:

$$N' = A2(X' - B2) \tag{2}$$

where X' represents the image signal value, N' the output density, A2 the slope of the straight line and B2 an offset.

Next, the two output density characteristics are compared at step S4. More specifically, with regard to an image signal Y calculated by applying a primary conversion Y=A(X−B) to an image signal X, it will suffice to define image adjustment coefficients A, B in accordance with Equations (1), (2) such that N=A2 (Y−B2) will hold at all times. The image adjustment coefficients A, B are calculated in accordance with the following equations at step S5:

$$A = A1/A2$$

$$B = B1 - A2 \cdot B2/A1 \quad (3)$$

The coefficients A, B thus obtained are set in the primary converter 107 at step S6 to establish a state in which the gamma-corrected image signal X can be converted and the corrected image signal Y obtained.

$$Y = A(X-B) = A1(X - B1 + A2 \cdot B2/A1)/A2 \quad (4)$$

By performing a first image adjustment in accordance with this method, the desired output density characteristic can be obtained irrespective of individual differences in the apparatus. This will be described later with regard to step S7 shown in FIG. 4.

[Problem encountered with first image adjustment]

The first image adjustment mentioned above is very effective with regard to an intermediate-density portion where the characteristic is linear. However, the characteristic of a low-density portion where the slope of the output density characteristic differs from that of the intermediate-density portion is not corrected satisfactorily. Accordingly, if merely the above-described image adjustment is applied to an apparatus for which the output density characteristic has deviated from the design center value, an individual difference will appear in the output density of the delivered image in the low-density portion thereof.

In a case where three image output modes having image reproducing characteristics that differ from one another, namely a "character mode" suited to the reproduction of character images, a "character/photograph" mode suited to the reproduction of images that are a mixture of characters and photographs, and a "photograph mode" suited to the reproduction of photographic images, are provided, the density reproducibility of low-density portions is not much of a problem with regard to the character mode. However, in a case where fine grayscale reproducibility of a low-density portion is desired, as in the photograph mode, the fact that the output density characteristic of the low-density portion differs is a major problem.

Figure 6:
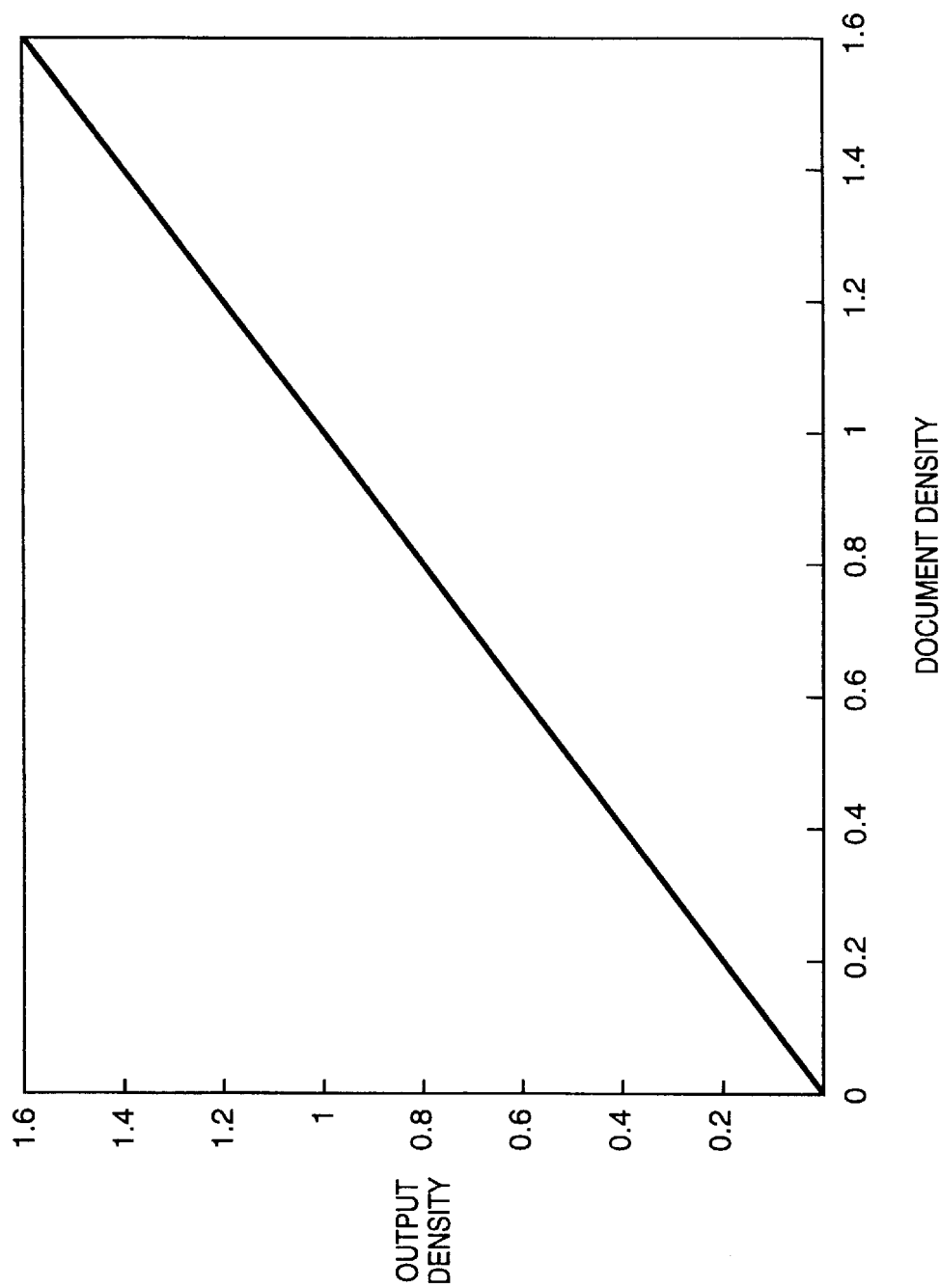
FIG. 6 is a characteristic diagram illustrating an example of an output density characteristic in a photograph mode.
Figure 7:
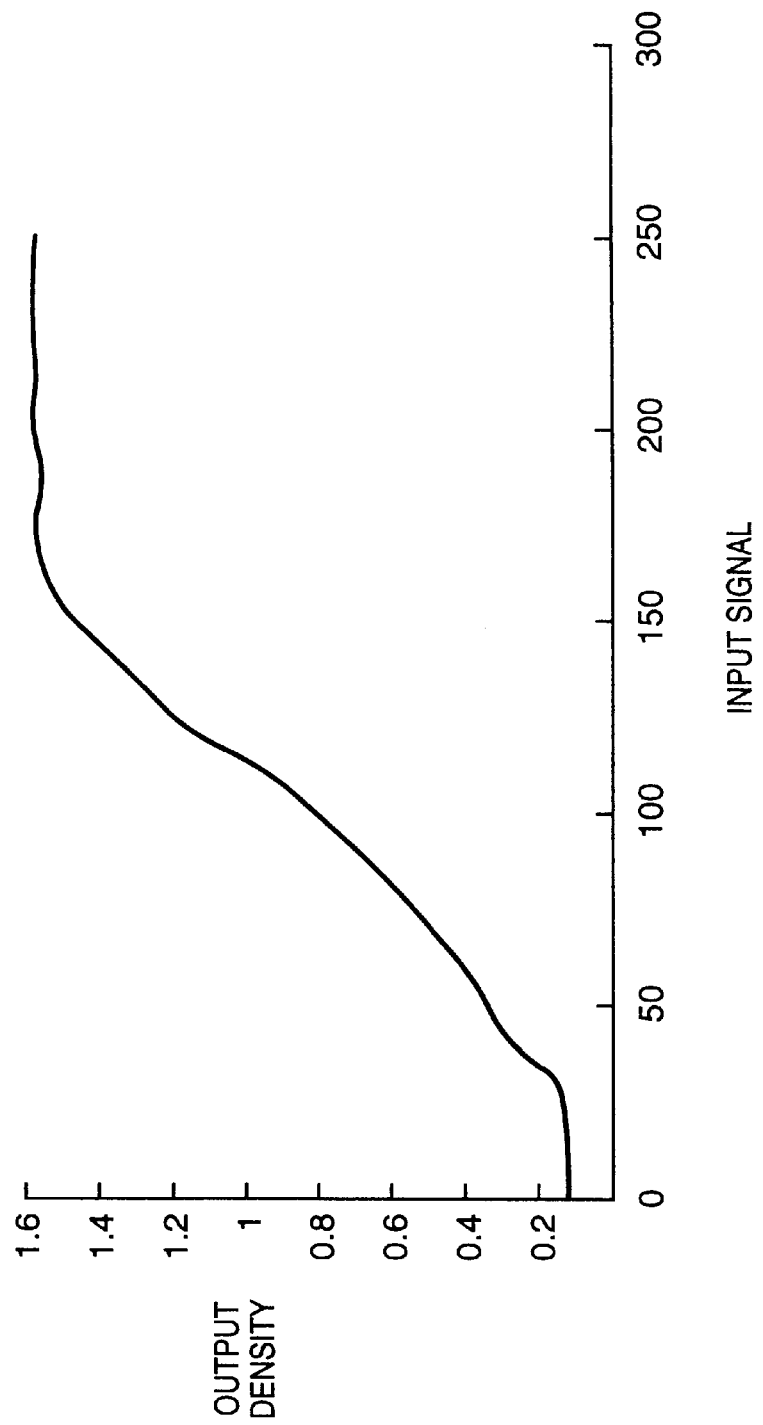
FIG. 7 is a characteristic diagram illustrating an example of output density characteristic (straight-thru output density characteristic) in a case where a primary conversion and gamma correction are not carried out in an apparatus operating at the design center value.
Figure 8:
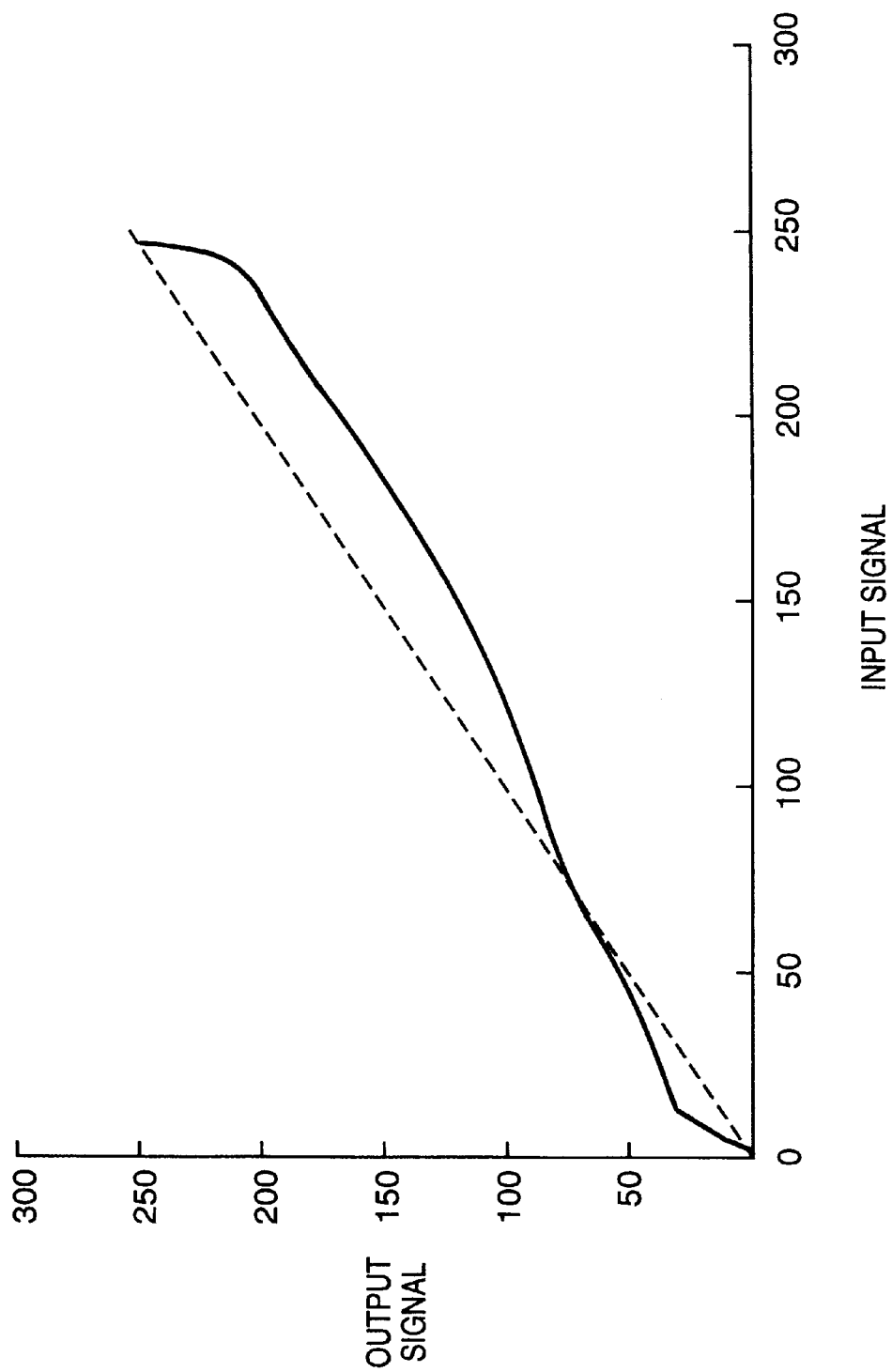
FIG. 8 is a diagram showing an example of a gamma table for obtaining an output density characteristic of the kind shown in FIG. 6 as opposed to the straight-thru output density characteristic of FIG. 7.

FIG. 6 shows an example of the output density characteristic in the photograph mode. The design is such that the relationship between input density and output density will be a straight line having a slope of approximately 45°. FIG. 7 shows an example of the output density characteristic (referred to as the "straight-thru output density characteristic" below) in a case where the primary conversion or gamma conversion is not carried out in an apparatus operating at the design center value. FIG. 8 shows a gamma table for obtaining an output density characteristic of the kind shown in FIG. 6 as opposed to the straight-thru output density characteristic of FIG. 7.

Figure 9:
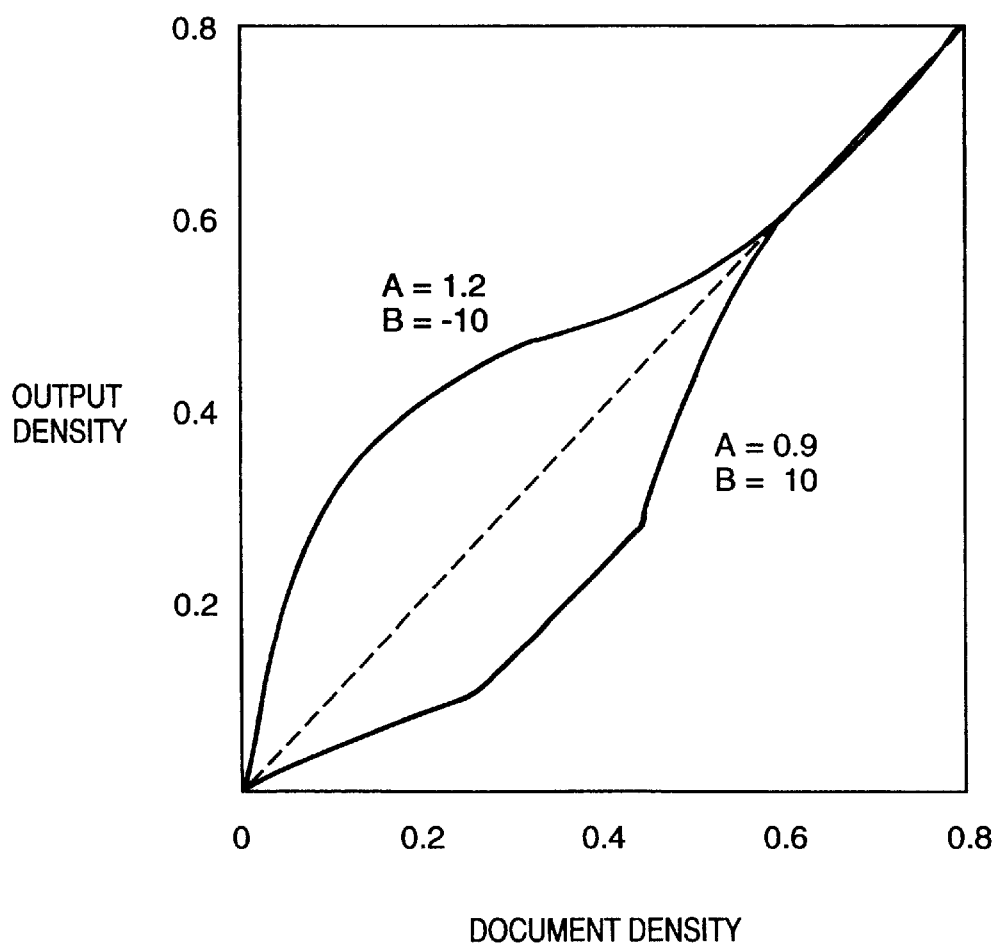
FIG. 9 is a diagram showing the correlation between values of image correction coefficients A, B and the output density characteristic of a low-density portion.

When the above-described image adjustment is carried out to correct for the individual difference in output density characteristic, the output density characteristic in low-density portions will deviate from the ideal line depending upon the values of the coefficients A, B. FIG. 9 is a diagram showing the correlation between values of the image correction coefficients A, B and the output density characteristic of a low-density portion. The larger the value of the coefficient A and the smaller the value of the coefficient B, the more the output density characteristic of the low-density portion deviates from the ideal line and the darker the image becomes. Conversely, the smaller the coefficient A and the larger the coefficient B, the lighter the image becomes.

Figure 10:
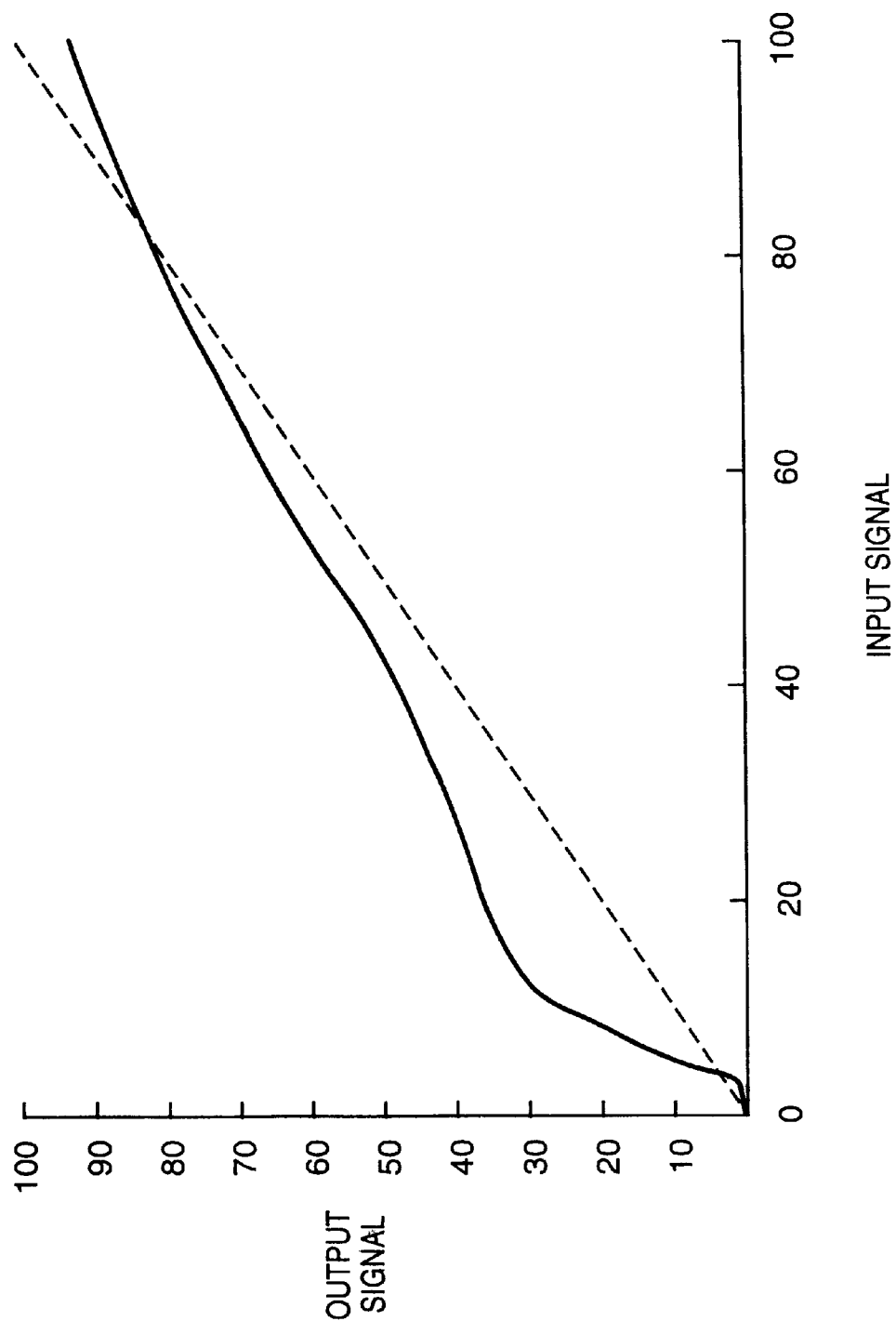
FIG. 10 is a diagram showing the low-density region of the gamma table of FIG. 8 in enlarged form.

This is ascribable to the shape of the low-density portion of the gamma table. FIG. 10 is a diagram showing the low-density region of the gamma table of FIG. 8 in enlarged form. Here the conversion slope of the gamma table is steepest where the input signal value is 10. Owing to application of the primary conversion, the region of the low-density portion where the slope is steep indicates a change larger than that of the intermediate-to-high density portion. Accordingly, in a case where the primary conversion is applied in a direction that will increase density, the low-density portion becomes more dense. Conversely, if the primary conversion is applied in a direction that will decrease density, the low-density portion becomes less dense.

Thus, in a case where the output density characteristic in the low-density portion deviates from the ideal line by a wide margin, the false-contour phenomenon often occurs in an image where low- and intermediate-density portions are continuous. When this phenomenon occurs, there is a pronounced decline in image quality, such as when reproducing the skin of a human being, and a reproduction that looks natural cannot be obtained.

In order to prevent the occurrence of this false-contour phenomenon, this embodiment is so adapted that the gamma table is changed over at step S7 in FIG. 4 depending upon the values of the coefficients A, B obtained by image adjustment. This embodiment has at least two types of gamma tables, of the kind shown in FIG. 11, in addition to the gamma table illustrated in FIG. 8. It should be noted that these two types of gamma tables are exactly the same except for the low-density portions thereof.

Figure 12:
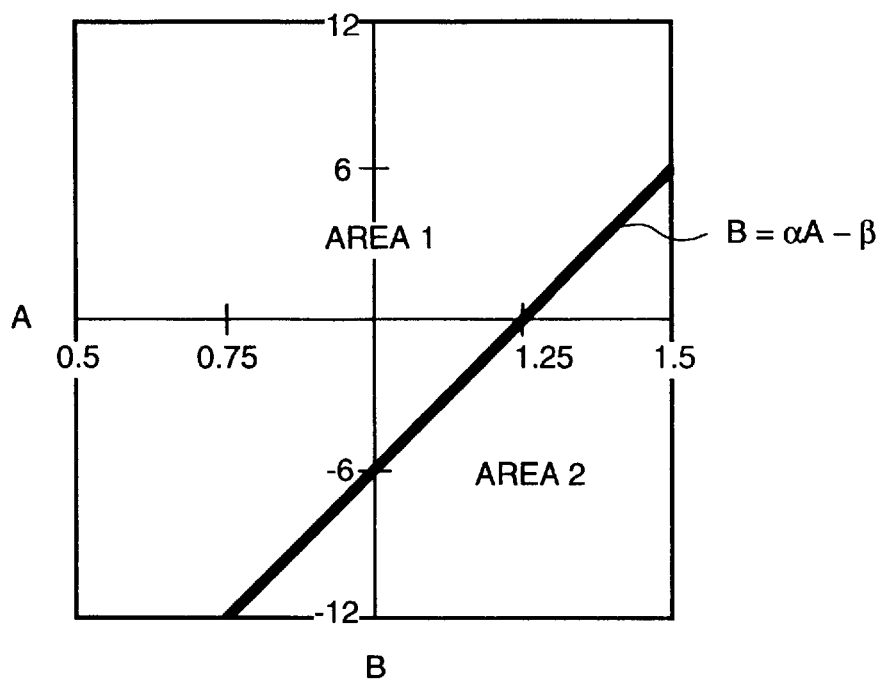
FIG. 12 is a diagram useful in describing control for switching between two types of gamma tables.

FIG. 12 is a diagram useful in describing control for switching between two types of gamma tables. The values of the coefficients A and B are plotted along the horizontal and vertical axes, respectively. The gamma table is selected depending upon in which of two areas, which are demarcated by the straight line B=αA −β, the values of the coefficients A and B reside as the result of the first image adjustment. It should be noted that α=24, β=30 in this embodiment.

Figure 11:
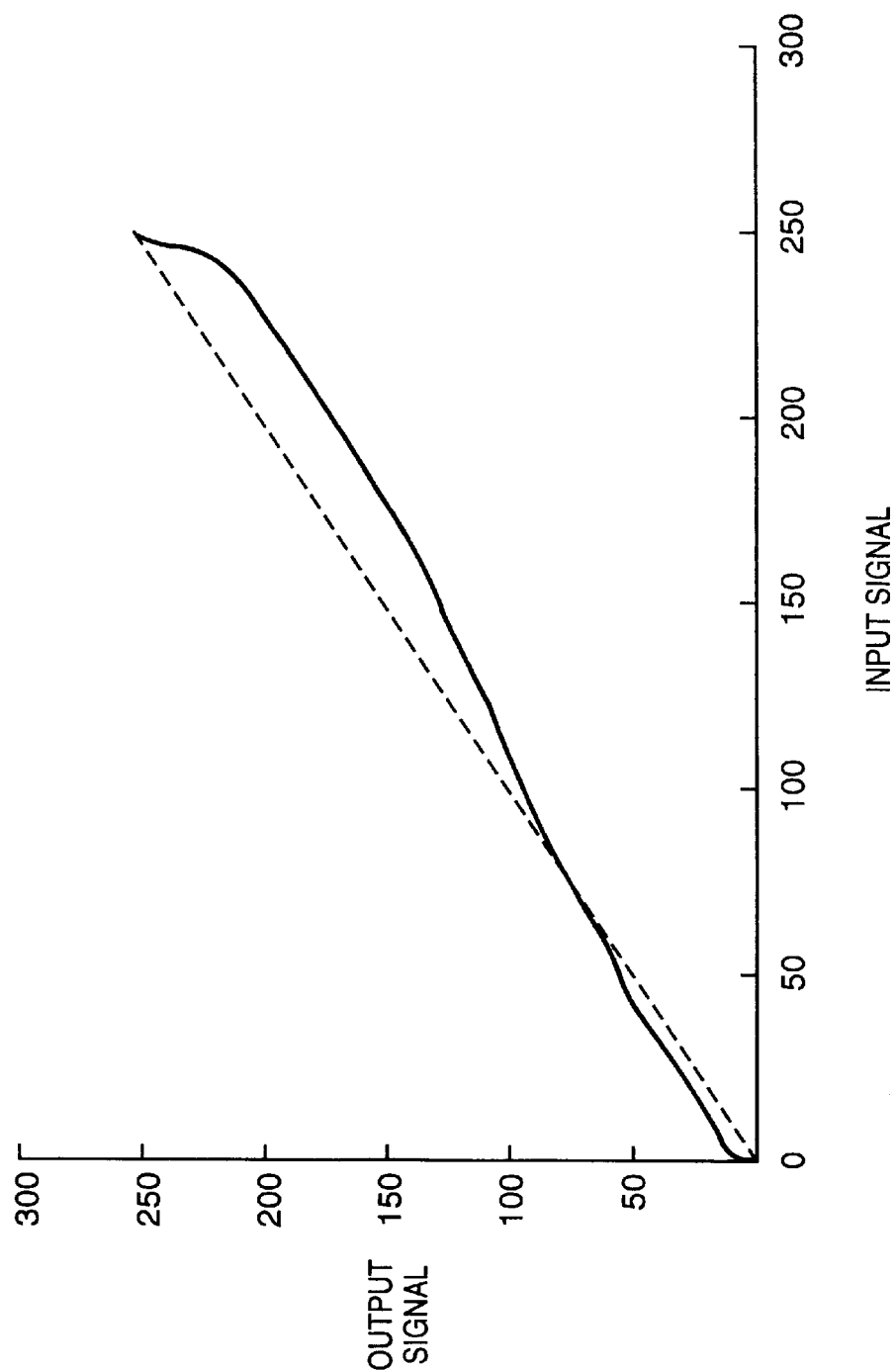
FIG. 11 is a diagram illustrating one more example of a gamma table.

In a case where the values of the coefficients A and B reside in area 1 shown in FIG. 12 as the result of the first image adjustment, control is performed in such a manner that the gamma table shown in FIG. 11 (namely the gamma table having the characteristic for which density decreases in the low-density portion) is selected. In a case where the values of the coefficients A and B reside in area 2 as the result of the first image adjustment, control is performed in such a manner that the ordinary gamma table shown in FIG. 8 is selected. This control shall be referred to as "automatic gamma selection" below.

The plurality of gamma tables mentioned above can be implemented using a RAM or ROM, and the selection of the gamma table is executed by the CPU 121 based upon the procedure described above.

In accordance with this embodiment, as described above, the target output density characteristic can be obtained by making the output density characteristic follow an ideal characteristic at densities above intermediate density through primary conversion control (first image adjustment) and automatic gamma selection control (second image adjustment). Such control also prevents the occurrence of the false-contour phenomenon in the low-density portion.

To deal with output modes such as the character mode and photograph mode mentioned above, the output density characteristic is changed in the resolution converter 108 or the developing bias in the developing device or discharge voltage in the corona discharge device is changed, thereby making it possible to change the density reproducibility. Further, in accordance with this embodiment, while simplifying the first image adjustment to make possible high-speed processing and lower cost, the correction of the first image adjustment can be carried out by the second image adjustment to make possible the formation of an excellent image.

Second Embodiment

An image processing apparatus according to second embodiment of the invention will now be described. Elements in the second embodiment similar to those of the first embodiment are designated by like reference characters and need not be described in detail again.

According to this embodiment, three gamma tables of different characteristics are prepared, two partitioning straight lines $B=\alpha A-\beta$ for selecting the gamma table are adopted and the gamma table is selected depending upon the values of the coefficients A and B after image adjustment.

Figure 13:
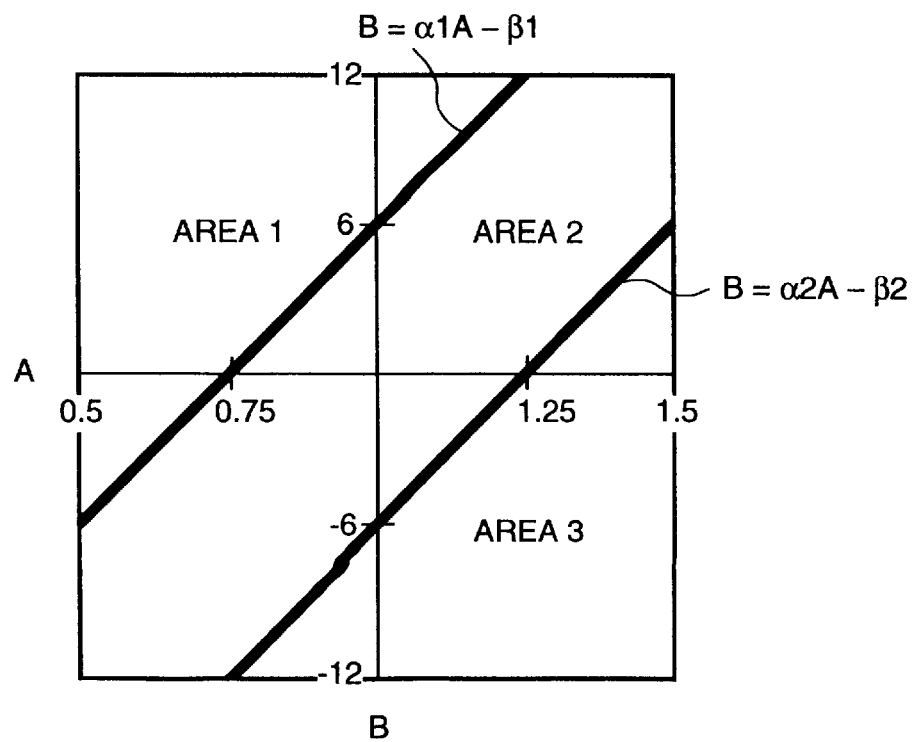
FIG. 13 is a diagram useful in describing control for switching among three types of gamma tables in a second embodiment of the invention.

More specifically, the area is divided into three areas 1, 2 and 3 by partitioning straight lines $B=\alpha 1A-\beta 1$ and $B=\alpha 2A-\beta 2$, as shown in FIG. 13. If the values of A and B reside in area 1, then the gamma table selected is one for which the output density characteristic of the low-density portion is somewhat suppressed (i.e., for which density is somewhat low) with respect to the design center value. If the values of A and B reside in area 2, then the gamma table selected is one for which the output density characteristic of the low-density portion is in line with the design center value. If the values of A and B reside in area 3, then the gamma table selected is one for which the output density characteristic of the low-density portion is somewhat pronounced (i.e., for which density is somewhat high). In this embodiment, it is so arranged that $\alpha 1=24$, $\alpha 2=24$, $\beta 1=18$, $\beta 2=30$.

By adopting this expedient, the number of gamma tables increases. However, an output density characteristic in line with that desired can be obtained by adjustment correction and automatic gamma selection even in an apparatus equipped with a printer having any output density characteristic prior to the adjustment stage.

Furthermore, the partitioning lines which partition the gamma tables are not limited to straight lines. Depending upon how the output density characteristic of the printer deviates from the design center value or depending upon the shape of the straight-thru output density characteristic of the design center value of the printer, the partitioning lines may be expressed by combinations of straight lines (polygonal lines) or by curves of any order.

The present invention can be applied to a system constituted by a plurality of devices (e.g., a host computer, interface, reader, printer, etc.) or to an apparatus comprising a single device (e.g., a copier or facsimile machine, etc.), as in the foregoing embodiments.

Further, it goes without saying that the object of the present invention can also be achieved by providing a storage medium storing the program codes of the software for performing the aforesaid functions of the embodiments to a system or an apparatus, reading the program codes with a computer (e.g., a CPU or MPU) of the system or apparatus from the storage medium, and then executing the program.

In this case, the program codes read from the storage medium realize the functions of the embodiments, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

Further, FIG. 3 illustrates an arrangement in which the primary converter 107 is in back of the gamma converter 106. However, the primary converter 107 may be provided in front of the gamma converter 106. Furthermore, the characteristic of the reader of the apparatus can be dealt with by providing the primary converter 107 in front of and in back of the gamma converter 106.

Thus, in accordance with the present invention as described above, there are provided an image processing apparatus and method through which individual differences in apparatus output characteristic are compensated for and a decline in image quality due to the false-contour phenomenon is prevented.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    converting means for converting input image data by using a condition for gamma conversion, wherein the condition is selectable from among plural conditions stored in advance in a memory;
    correcting means for correcting image data, which has undergone conversion by said converting means, by using a correcting function;
    calibrating means for calibrating the correcting function; and
    selecting and setting means for selecting a condition from the stored plural conditions for the gamma conversion in accordance with a result of calibration by said calibrating means, and for setting the selected condition as the condition for gamma conversion by said converting means.

2. The apparatus according to claim 1, wherein said correcting means performs a primary conversion.

3. The apparatus according to claim 1, wherein said converting means performs the gamma conversion by using a table.

4. The apparatus according to claim 1, wherein the plural conditions for the gamma conversion have characteristics of a low-density portion, each of which is different from each other.

5. The apparatus according to claim 1, wherein said apparatus has a plurality of image processing modes corresponding to types of original images.

6. The apparatus according to claim 5, wherein the image processing modes include at least a character mode and a photograph mode.

7. The apparatus according to claim 1, further comprising a scanner which reads an image of an original.

8. The apparatus according to claim 1, further comprising image forming means for forming an image based on the image data corrected by said correcting means.

9. An image processing method comprising the steps of:

converting input image data by using a condition for gamma conversion, wherein the condition is selectable from among plural conditions stored in advance in a memory;

correcting image data, which has undergone the gamma conversion by using a correcting function;

calibrating the correcting function;

selecting a condition from the stored plural conditions for the gamma conversion in accordance with a result of the calibration in the calibrating step; and setting the selected condition as the condition for the gamma conversion in the converting step.

10. An image processing method of performing conversion on input image data by using a condition for gamma conversion, and then performing correction of the converted image data by using a correction function, wherein the condition for gamma conversion is selectable from among plural conditions stored in advance in a memory, comprising the steps of:

calibrating the correcting function; and selecting a condition from the stored plural conditions for the gamma conversion in accordance with a result of the calibration in said calibrating step.

11. The method according to claim 10, wherein the correcting function is a primary conversion function.

12. The method according to claim 10, wherein the memory stores plural gamma conversion tables.

13. The method according to claim 10, wherein the image processing method is used in an electrophotography process.

14. The method according to claim 10, wherein the image processing method is performed in a copying apparatus.

15. An image processing method of performing correction on input image data by using a correcting function, and then conversion of the corrected input image data by using a condition for gamma conversion, wherein the condition for gamma conversion is selectable from among plural conditions stored in advance in a memory, comprising the steps of:

calibrating the correcting function; and selecting a condition from the stored plural conditions for the gamma conversion in accordance with a result of the calibration in said calibrating step.

16. The method according to claim 15, wherein the correcting function is a primary conversion function.

17. The method according to claim 15, wherein the memory stores plural gamma conversion tables.

18. The method according to claim 15, wherein the image processing method is used in an electrophotography process.

19. The method according to claim 15, wherein the image processing method is performed in a copying apparatus.

* * * * *

UNITED STATES PATENT AND TRADEMARK OFFICE
CERTIFICATE OF CORRECTION

PATENT NO. : 6,226,108 B1
DATED : May 1, 2001
INVENTOR(S) : Yuichiro Toyohara et al.

Page 1 of 1

It is certified that error appears in the above-identified patent and that said Letters Patent is hereby corrected as shown below:

<u>Title page,</u>
References Cited - U.S. PATENT DOCUMENTS
"5,586,927" should read -- 5,585,927 --.

<u>Column 4,</u>
Line 27, "as · well" should read -- as well --.

<u>Column 6,</u>
Line 28, "obtained." should read -- obtained. ¶ [Switching of gamma tables (second image adjustment)] --.

Signed and Sealed this

Fourteenth Day of May, 2002

Attest:

*Attesting Officer*

JAMES E. ROGAN
*Director of the United States Patent and Trademark Office*